(12) United States Patent
Wolfe, Jr. et al.

(10) Patent No.: US 9,992,975 B2
(45) Date of Patent: Jun. 12, 2018

(54) ARTICLE INCLUDING A SOUND-PRODUCING MEMBER

(71) Applicants: Jerry J. Wolfe, Jr., Hutto, TX (US); Harold Keith Benson, Hutto, TX (US)

(72) Inventors: Jerry J. Wolfe, Jr., Hutto, TX (US); Harold Keith Benson, Hutto, TX (US)

(73) Assignee: Starmark Pet Products, Inc, Hutto, TX (US)

( * ) Notice: Subject to any disclaimer, the term of this patent is extended or adjusted under 35 U.S.C. 154(b) by 129 days.

(21) Appl. No.: 14/606,877

(22) Filed: Jan. 27, 2015

(65) Prior Publication Data

US 2016/0212975 A1 Jul. 28, 2016

(51) Int. Cl.
*A01K 15/02* (2006.01)
*A01K 5/01* (2006.01)

(52) U.S. Cl.
CPC .......... *A01K 15/025* (2013.01); *A01K 5/0114* (2013.01)

(58) Field of Classification Search
CPC ...... A01K 15/025; A01K 15/026; A63H 3/02; A63H 3/04; A63H 3/28
USPC ........................................ 119/707, 709–711
See application file for complete search history.

(56) References Cited

U.S. PATENT DOCUMENTS

| | | | |
|---|---|---|---|
| 2,003,958 A | 6/1935 | Salisbury | |
| 2,185,547 A | 1/1940 | Fowler | |
| 4,802,444 A | 2/1989 | Markham et al. | |
| RE34,352 E | 8/1993 | Markham et al. | |
| 5,619,954 A | 4/1997 | Rotondi | |
| 5,711,254 A | 1/1998 | O'Rourke | |
| 5,722,672 A * | 3/1998 | Frederick | B62B 5/06 150/154 |
| 5,813,366 A | 9/1998 | Mauldin, Jr. | |
| 5,827,109 A * | 10/1998 | Krull | A63H 33/18 446/373 |
| 5,865,146 A | 2/1999 | Markham | |
| 5,965,182 A | 10/1999 | Lindgren | |
| 6,112,703 A | 9/2000 | Handelsman | |
| 6,126,510 A | 10/2000 | Weiss, Jr. | |
| 6,148,771 A | 11/2000 | Costello | |

(Continued)

OTHER PUBLICATIONS

Wolfe et al., Extended European Search Report, Application No. 16152673.6 (Patent No. 1655), dated Jun. 23, 2016.

*Primary Examiner* — Marc R Burgess
*Assistant Examiner* — Morgan T Barlow
(74) *Attorney, Agent, or Firm* — Russell Ng PLLC; Brian F. Russell

(57) ABSTRACT

An article includes flexible and resilient outer and inner bodies, where the inner body is at least partially disposed within the outer body. In addition, an unsealed sound-producing member surrounds at least a portion of the inner body and is disposed between the inner and outer bodies, such that the sound-producing member produces sound when the outer body is deformed. In one embodiment, the outer body includes an interior cavity and a plurality of inwardly facing projections that project into the interior cavity to focus force applied to the outer body on the sound-producing member. In one embodiment, the inner body includes a sidewall defining an interior cavity for holding items to be dispensed, and the article has one or more openings through the inner and outer bodies through which items can be inserted into and dispensed from the interior cavity of the inner body during use of the article.

16 Claims, 4 Drawing Sheets

(56) References Cited

U.S. PATENT DOCUMENTS

| | | |
|---|---|---|
| 6,202,598 B1 | 3/2001 | Willinger |
| 6,240,879 B1 | 6/2001 | Denesuk et al. |
| 6,305,326 B1 | 10/2001 | Suchowski et al. |
| 6,415,741 B2 | 7/2002 | Suchowski et al. |
| 6,427,634 B1 | 8/2002 | Mann |
| 6,470,830 B2 | 10/2002 | Mann |
| 6,474,268 B1 | 11/2002 | Suchowski et al. |
| 6,546,896 B1 | 4/2003 | Markham |
| D479,897 S | 9/2003 | Willinger |
| 6,634,318 B1 | 10/2003 | Rucker |
| 6,918,355 B1 * | 7/2005 | Arvanites ............ A01K 15/026 119/707 |
| 6,935,274 B1 * | 8/2005 | Rothschild ........... A01K 15/025 119/702 |
| D513,096 S | 12/2005 | Stiles |
| 6,981,471 B1 | 1/2006 | Dubinins et al. |
| 7,032,541 B1 | 4/2006 | Tsengas |
| 7,074,106 B1 * | 7/2006 | Deutsch ................ A63H 33/22 119/711 |
| 7,137,358 B2 | 11/2006 | Denesuk et al. |
| 7,146,934 B1 | 12/2006 | Staley |
| 7,234,420 B1 | 6/2007 | Tsengas |
| 7,270,085 B2 | 9/2007 | Wolfe, Jr. et al. |
| D552,307 S | 10/2007 | Renforth et al. |
| 7,293,429 B1 | 11/2007 | Reichert |
| D562,419 S | 2/2008 | Crane et al. |
| 7,389,748 B2 | 6/2008 | Shatoff et al. |
| RE40,430 E | 7/2008 | Markham |
| 7,500,450 B2 | 3/2009 | Wolfe, Jr. et al. |
| 7,506,613 B2 | 3/2009 | Wolfe, Jr. et al. |
| 7,506,614 B1 | 3/2009 | Tsengas |
| 7,555,997 B2 | 7/2009 | Wolfe, Jr. et al. |
| 7,591,234 B2 | 9/2009 | Shatoff et al. |
| 7,600,488 B2 | 10/2009 | Mann |
| 7,640,894 B2 | 1/2010 | Jager |
| 7,647,894 B2 | 1/2010 | Axelrod et al. |
| 7,694,653 B2 | 4/2010 | Axelrod |
| 7,730,853 B2 | 6/2010 | Axelrod et al. |
| D624,251 S | 9/2010 | Rutherford |
| D625,056 S | 10/2010 | Kelly |
| 7,810,455 B2 | 10/2010 | Axelrod et al. |
| 7,930,996 B2 | 4/2011 | Axelrod et al. |
| 8,141,521 B2 | 3/2012 | Shatoff et al. |
| D665,136 S | 8/2012 | Day |
| 8,276,547 B2 | 10/2012 | Markham |
| 8,312,844 B2 | 11/2012 | Mann |
| D672,513 S | 12/2012 | Wolfe, Jr. et al. |
| 8,342,132 B2 | 1/2013 | Markham |
| 8,342,133 B2 | 1/2013 | Markham |
| 8,402,923 B2 | 3/2013 | Jager |
| 8,413,611 B2 | 4/2013 | Axelrod |
| 8,464,665 B1 | 6/2013 | Scheffler et al. |
| 8,464,666 B2 | 6/2013 | Chefetz et al. |
| 8,468,977 B2 | 6/2013 | Markham |
| 8,516,977 B2 | 8/2013 | Shatoff et al. |
| 8,534,232 B2 | 9/2013 | Axelrod et al. |
| 8,573,159 B1 | 11/2013 | Crotty et al. |
| 2001/0022159 A1 | 9/2001 | Zangel et al. |
| 2002/0095725 A1 * | 7/2002 | Dix ........................ A47D 15/00 5/482 |
| 2003/0079693 A1 | 5/2003 | Jager |
| 2004/0244719 A1 | 12/2004 | Jager |
| 2005/0115517 A1 * | 6/2005 | Wolfe, Jr. ............ A01K 15/026 119/707 |
| 2006/0201446 A1 | 9/2006 | Edwards |
| 2006/0225666 A1 | 10/2006 | Axelrod |
| 2007/0044729 A1 | 3/2007 | Denesuk et al. |
| 2007/0085324 A1 * | 4/2007 | Locker ................. A01K 15/025 281/15.1 |
| 2008/0121190 A1 | 5/2008 | Moulton |
| 2008/0280526 A1 | 11/2008 | Chase |
| 2009/0000565 A1 | 1/2009 | Bryce |
| 2009/0025648 A1 | 1/2009 | Simon |
| 2009/0064942 A1 | 3/2009 | Shatoff et al. |
| 2010/0095902 A1 | 4/2010 | Kuwa |
| 2010/0147227 A1 | 6/2010 | Lind |
| 2010/0186682 A1 * | 7/2010 | Myers, Jr. ............ A01K 15/026 119/709 |
| 2010/0224138 A1 | 9/2010 | Axelrod et al. |
| 2011/0192353 A1 | 8/2011 | Willinger et al. |
| 2011/0209261 A1 * | 9/2011 | Lyle ..................... A41B 13/10 2/49.1 |
| 2011/0232583 A1 | 9/2011 | Yamin |
| 2011/0277696 A1 | 11/2011 | Rutherford et al. |
| 2011/0297104 A1 | 12/2011 | Axelrod et al. |
| 2011/0303160 A1 | 12/2011 | Axelrod et al. |
| 2012/0090554 A1 | 4/2012 | Nunn et al. |
| 2012/0124740 A1 * | 5/2012 | Castle ................. A47D 15/003 5/420 |
| 2012/0125267 A1 | 5/2012 | Kelly |
| 2013/0019812 A1 | 1/2013 | Rutherford et al. |
| 2013/0074780 A1 | 3/2013 | Wechsler |
| 2013/0097901 A1 | 4/2013 | Cooper |
| 2013/0213316 A1 | 8/2013 | Zhang et al. |
| 2013/0247836 A1 | 9/2013 | Axelrod et al. |
| 2014/0060451 A1 | 3/2014 | Oblack et al. |

* cited by examiner

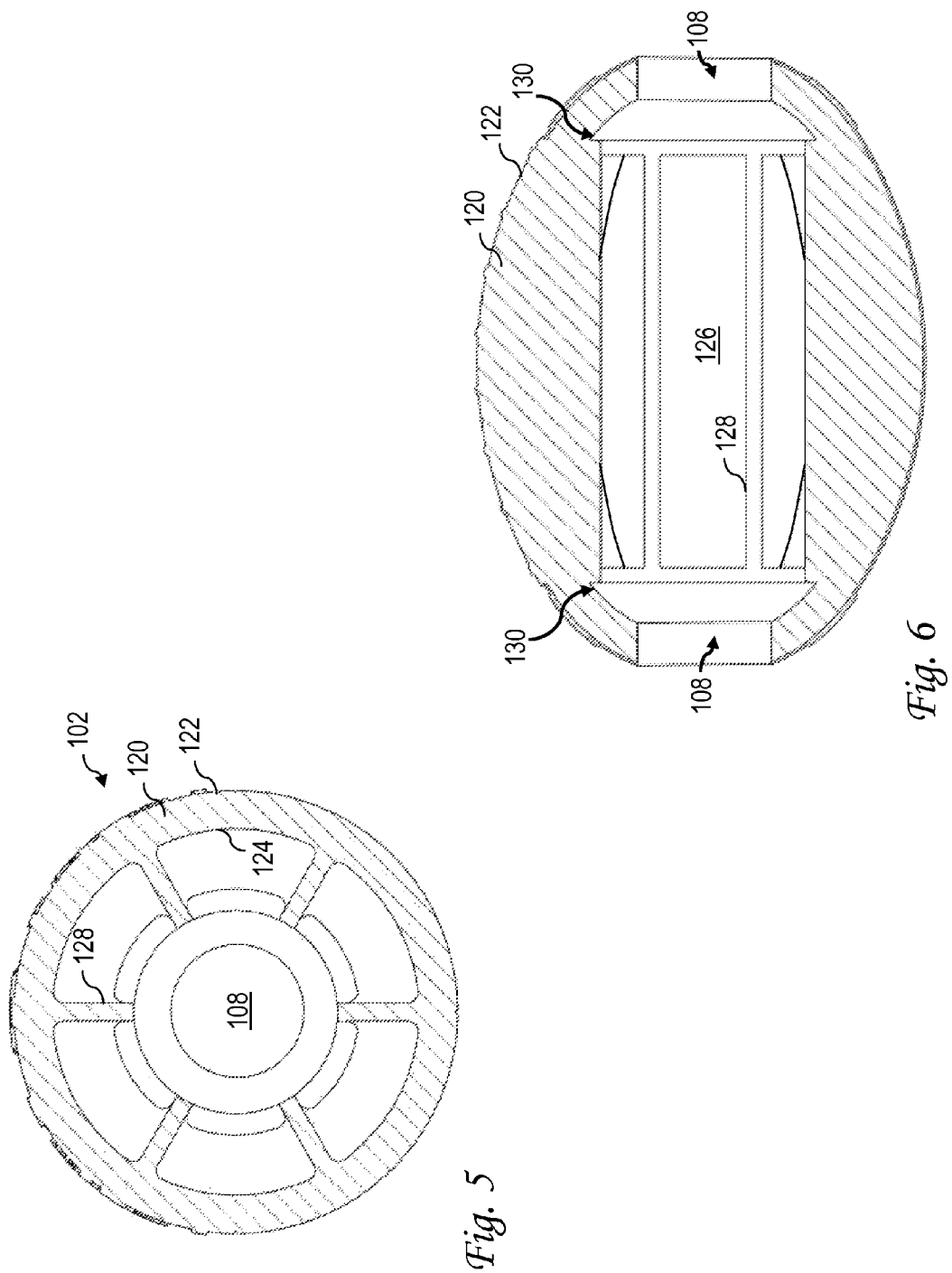

ARTICLE INCLUDING A SOUND-PRODUCING MEMBER

BACKGROUND OF THE INVENTION

The present invention relates to articles of manufacture and associated methods, and more specifically, to articles such as containers, pet toys, treat and food dispensers, and balls and associated methods of manufacture and use.

It is well known in the art that boredom is a significant contributor to destructive behavior in domesticated animals. For example, U.S. Pat. No. 6,634,318 to Rucker and the prior art referenced therein disclose that barking, digging and other destructive behaviors are common problem behaviors of canines that become discontented or bored. As further disclosed in these patents, one common approach utilized in the art to address such destructive behaviors in dogs is to provide a toy with which the dog can interact and that encourages such interaction by rewarding the dog. For example, a first class of dog toys dispense food (e.g., treats) from a hollow interior cavity through an opening as a dog interacts with the toy. A second class of dog toy encourages interaction by providing an alternative stimulus, such as a sound or noise.

Examples of this second class of dog toys include pet toys that include squeakers or whistles. Further examples include dog toys, such as that disclosed in US 2011/0192353 by Willinger et al., which include a sound-producing member that makes a crinkling or crackling sound. In that publication, Willinger et al. specifically found:

When objects having crinkling, crackling, and/or rustling noise characteristic are handled or engaged by animals, such as dogs, the crinkling, crackling, and/or rustling noise characteristics enhance interest in the object and lengthen the interaction with the object, possibly because it resembles prey animals rustling through leaves and evokes a chasing and/or hunting instinct in dogs.

With regard to the sound-producing member, Willinger et al. further taught that the sound-producing member is covered by a protective material and then sealed such that the sound-producing member "retains at least ambient pressure within the sound-producing member to prevent the sound-producing member from collapsing when chewed or otherwise engaged by the pet."

BRIEF SUMMARY

The present disclosure appreciates that sealing the sound-producing member in an article as taught in the prior art undesirably introduces into the article an additional mode of failure, namely, failure of the seal of the sound-producing member, leading to collapse and permanent deformation of the sound-producing member.

The present disclosure also appreciates that configuring an article, such as a pet toy, to provide multiple stimuli, such as a sound and an edible treat, encourages more interaction and a greater duration of interaction with the article than if the article were configured to provide only a single stimuli, such as sound alone.

The present disclosure further appreciates that the conventional configuration of an article having a sound-producing member that makes a crinkling or crunching sound does not produce a sound sufficiently loud and/or consistently repeatable as would be desirable to hold the interest of a human and/or pet.

In at least one embodiment, an article, such as a pet toy, includes flexible and resilient outer and inner bodies, where the inner body is at least partially disposed within the outer body. In addition, an unsealed sound-producing member surrounds at least a portion of the inner body and is disposed between the inner and outer bodies, such that the sound-producing member produces sound when the outer body is deformed.

In at least one embodiment, the outer body includes an interior cavity and a plurality of inwardly facing projections that project into the interior cavity to focus force applied to the outer body on the sound-producing member.

In at least one embodiment, the inner body includes a sidewall defining an interior cavity for holding items to be dispensed, and the article has one or more openings through the inner and outer bodies through which items can be inserted into and dispensed from the interior cavity of the inner body during use of the article.

BRIEF DESCRIPTION OF THE SEVERAL VIEWS OF THE DRAWINGS

FIG. 5 is a section view of the outer body of the pet toy of FIG. 1, taken along line A-A of FIG. 2;

FIG. 6 is a section view of the outer body of the pet toy of FIG. 1, taken along line B-B of FIG. 4;

DETAILED DESCRIPTION

Figure 1:
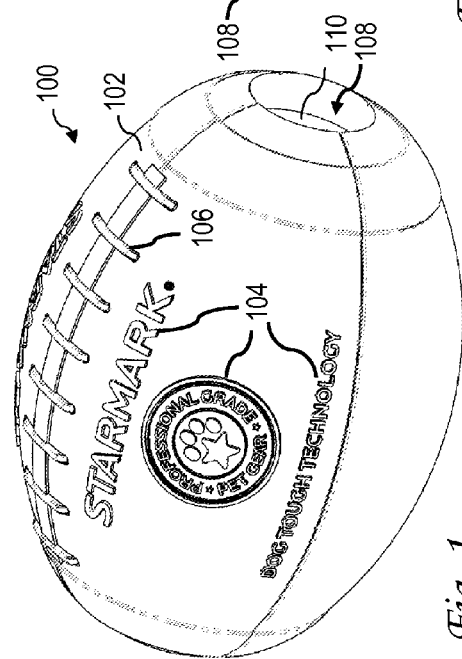
FIG. 1 is a perspective view of a pet toy in accordance with one embodiment.
Figure 2:
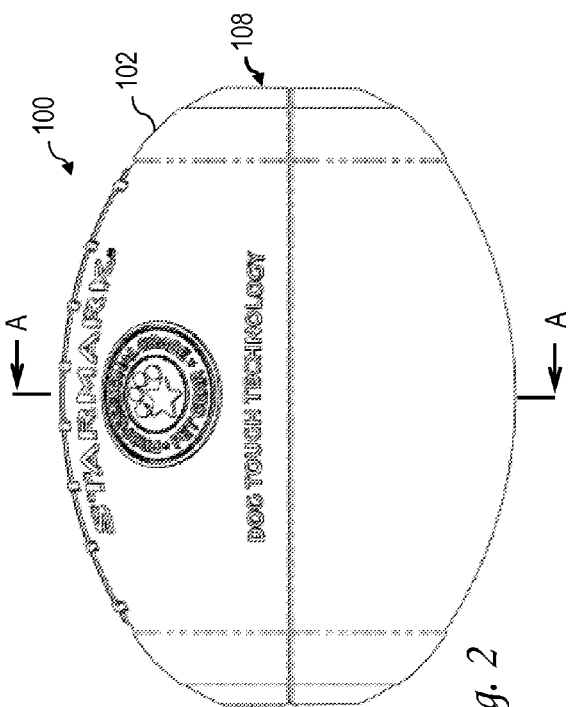
FIG. 2 is a front elevation view of the pet toy of FIG. 1, where the back elevation view is identical.

Disclosed herein are innovative articles, such as containers, pet toys, treat and food dispensers, and balls, that include a sound-producing member and a dispensing cavity, as well as associated methods of manufacture and use. In one embodiment described in detail herein, an article includes a resilient outer body 102 (see, e.g., FIGS. 1-6), an inner body 140 at least partially disposed within the outer body that includes an interior cavity for holding animal treats (see, e.g., FIGS. 7-8), and a sound-producing member 150 disposed within the outer body that produces a sound as the resilient outer body is deformed (see, e.g., FIGS. 7-8).

With reference now to the figures and with particular reference to FIGS. 1-4, perspective, front elevation, right side elevation and top plan views of an exemplary pet toy 100 in accordance with one embodiment are illustrated. As shown, pet toy 100 includes an outer body 102 that defines or contributes to the overall form of pet toy 100. Outer body 102 may have any generally closed form that provides at least one interior cavity and may further be designed to simulate or mimic the form of other familiar objects. In the depicted example, outer body 102 is a generally closed radially symmetric form having or suggesting the form of an American football.

In a preferred embodiment, outer body 102 of pet toy 100 is made of a durable, flexible, and resilient material, such as an elastomer. As one example, outer member 102 may be injection molded of a thermoplastic elastomer (TPE). The thickness of outer body 102 can vary between embodiments, but should be selected to be thick enough to resist tearing and permanent deformation under its intended use. The flexibility and resiliency of the material from which outer body 102 is formed provide resistance to deformation during use, and if outer body 102 is deformed (e.g., by an animal biting or otherwise applying force to pet toy 100), cause outer body 102 to rapidly return to its original form once the force causing the deformation is removed.

The outer surface of outer body 102 may optionally further bear or have formed therein various indicia. For example, in the depicted example, outer body 102 has formed therein first indicia 104 providing branding information, as well as second indicia 106 (e.g., simulated laces) identifying or suggesting the article (e.g., an American football) mimicked by pet toy 100.

Outer body 102 has at least one opening 108 (and in the illustrated embodiment, two openings 108) formed therein through which items, for example, food items or treats, can be dispensed from an interior of outer body 102. In the depicted embodiment, each opening 108 is filled by an end wall 110 of the inner body 140 (see, e.g., FIG. 7). In some embodiments, such as the one depicted in FIGS. 1-4, end walls 110 of the inner body 140 are inset from the outer surface of outer body 102 such that a recess in the outer surface of outer body 102 is formed at each opening 108. In other embodiments, end walls 110 can be flush with the outer surface of outer body 102 or can extend through opening(s) 108 outwardly from the outer surface of outer body 102.

Referring now to FIGS. 5 and 6, there are depicted section views of outer body 102 of pet toy 100 of FIGS. 1-4, taken along lines A-A and B-B, respectively. As shown, outer body 102 has a sidewall 120 having an outer surface 122 and an inner surface 124. Inner surface 124 of outer body 102 defines an interior cavity 126 of outer body 102 into which multiple ribs or projections 128 integral to outer body 102 inwardly project. Ribs 128 enhance the rigidity of outer body 102 and serve to retain inner body 140 centrally within interior cavity 126. In addition, ribs 128 focus the force applied to sidewall(s) 120 on sound-producing member 150 and inner body 140 by reducing the total surface area over which such force is applied. This increase in force has been found experimentally to yield a louder and more consistent production of sound by sound-producing member 150.

In at least one embodiment, inner surface 122 has at least one surface feature formed therein to promote retention of inner body 140 within interior cavity 126. For example, in the depicted example, inner surface 122 has an annular recess or notch 130 formed therein adjacent to each of openings 108. Annular recesses 130 interlock with and serve to retain inner body 140 within interior cavity 126 of outer body 102, as discussed further below with reference to FIG. 8.

Figure 7:
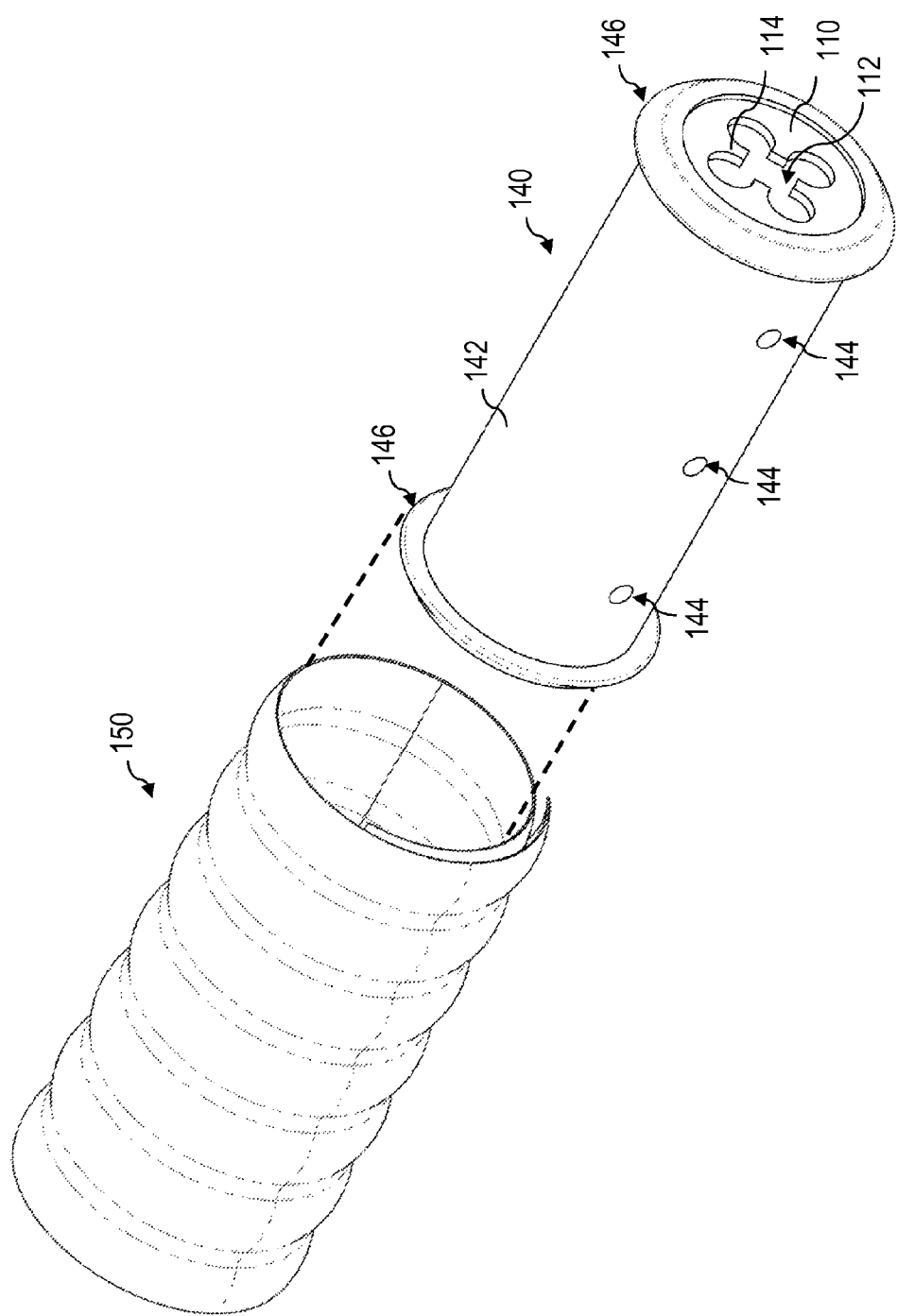
FIG. 7 is a partially exploded view illustrating assembly of exemplary embodiments of the inner body and the sound-producing member.

With additional reference now to FIG. 7, there is illustrated a partially exploded view of the assembly of exemplary embodiments of the inner body 140 and sound-producing member 150 of pet toy 100.

Figure 3:
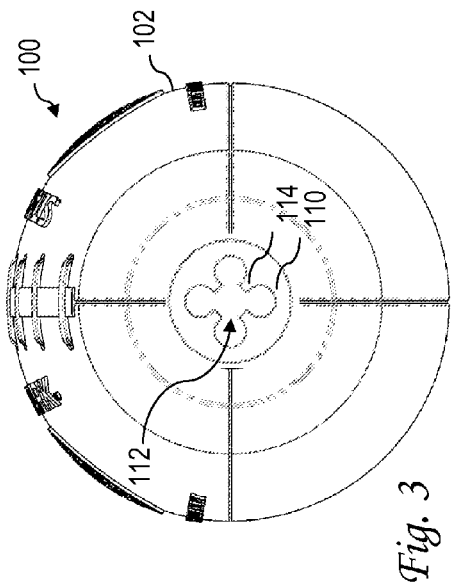
FIG. 3 is a right side elevation view of the pet toy of FIG. 1, where the left side elevation view is identical.

In preferred embodiments, inner body 140 is made of a durable, flexible, and resilient material, such as an elastomer. As one example, inner body may be injection molded of TPE. In various embodiments, inner body 140 may have any of a wide variety of forms that are partially or fully disposed within interior cavity 126 of outer body 102 when pet toy 100 is fully assembled. For example, in the depicted embodiment, inner body 140 has a generally cylindrical form including a sidewall 142 and two end walls 110 (one of which is shown in FIGS. 1 and 3). One or more of end walls 110 of inner body 140 have formed therein one or more openings 112 through which items, for example, food items or treats, can be dispensed from an interior cavity 160 of inner body 120 (see, e.g., FIG. 8). In the depicted embodiment, the passage of items through each opening 112 is metered by one or more flaps 114 integral to the associated end wall 110 of the inner body 140.

Sidewall 142 may optionally have one or more additional holes 144 formed therein to promote the transmission of sound produced by sound-producing member 150 to an exterior of pet toy 100. Holes 144, if present, are preferably sized to prevent intact items within the interior cavity of inner body 140 from passing through holes 124.

In the depicted embodiment, each of end walls 110 has a circumferential flange 146 having a greater radius than sidewall 142 with respect to a central axis of inner body 140. Circumferential flanges 146 are preferably located and dimensioned to engage annular recesses 130 to promote retention of inner body 140 within interior cavity 126 of outer body 102 during use of a fully assembled pet toy 100.

Sound-producing member 150 is preferably formed of a material selected to produce a desired sound for one or more intended uses of the article when sound-producing member 150 is deformed. For example, for a pet toy 100 intended for use by dogs, it is desirable if sound-producing member 150 produces a crinkling, crackling, rustling and/or crunching sound when deformed, for example, by a dog biting or otherwise deforming pet toy 100. To this end, sound-producing member 150 may be formed (i.e., thermoformed) of a thermoplastic polymer resin, such polyethylene terephthalate (PET). Alternatively, sound-producing member 150 may be formed, for example, of a high density polyethylene (HDPE), low density polyethylene (LDPE), polyvinyl chloride (PVC), polypropylene, post consumer resin (PCR), or K-Resin® styrene-butadiene copolymers (SBC).

In one particularly preferred configuration, sound-producing member 150 is configured as a loose roll of a sheet of undulate film, rather than an enclosed or sealed member. The undulations enhance the rigidity and sound production of sound-producing member 150, as well as the ability of sound-producing member 150 to return to its original shape following deformation. As shown, it is also preferred if the loose ends of the roll overlap (e.g., by at least 10% to 50% of the circumference of the roll and, more particularly, between 15%-30% of the circumference of the roll) to reduce the occurrence of unrolling when sound-producing member 130 is deformed in use. In alternative embodiments, a loose end sound-producing member 150 may be attached back to the roll of material forming sound-producing member 150, for example, by a mechanical fastener (e.g., staple), adhesive, sonic welding, or the application of heat. Such attachment may be performed either before or after sound-producing member 150 is assembled onto inner body 140.

As indicated in FIG. 7, sound-producing member 150 is assembled onto inner body 140 by coiling or wrapping sound-producing member 150 around sidewall 142. Flanges 146 at either end of sidewall 142 serve to retain sound-producing member 150 in this configuration in use. The flexibility and resiliency of inner body 140 permit sound-producing member 150 to be deformed in order to produce a sound and, following removal of the deforming force, impart an outward force to sound-producing member 150 to enable sound-producing member 150 to reliably return to its original configuration after the sound-producing deformation. In this manner, the production of sound by sound-producing member 150 is consistent and rapidly repeatable.

Figure 4:
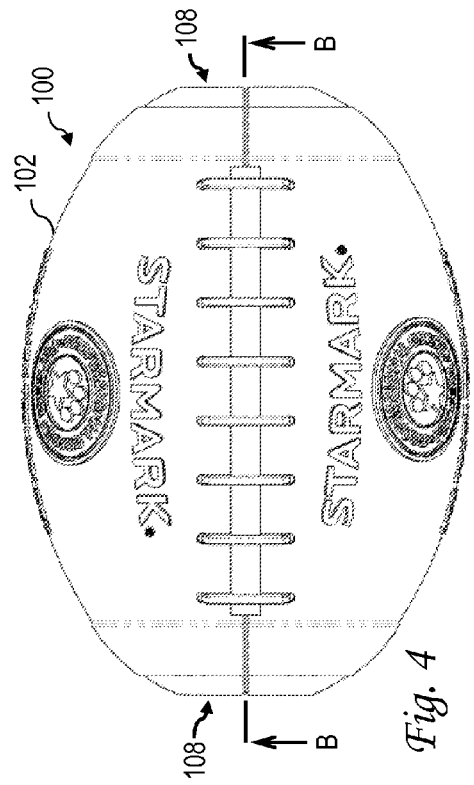
FIG. 4 is a top plan view of the pet toy of FIG. 1.
Figure 8:
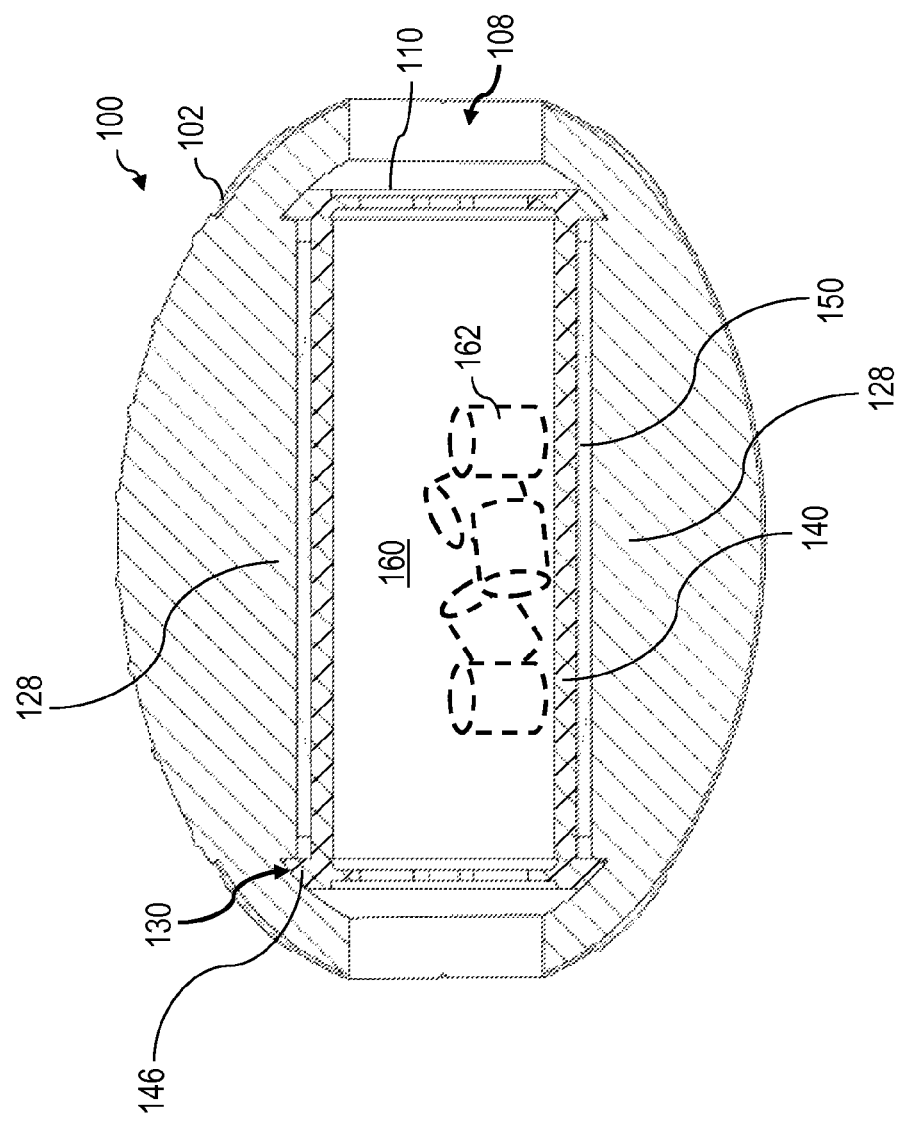
FIG. 8 is a section view of the assembled pet toy of FIG. 1, taken along line B-B of FIG. 4.

Referring now to FIG. 8, there is depicted a section view of the assembled pet toy 100 of FIG. 1, taken along line B-B of FIG. 4. To assemble pet toy 100, the subassembly comprising inner body 140 and sound-producing member 150 (as described above with reference to FIG. 7) is inserted through one of openings 108 into interior cavity 126 until circumferential flanges 146 engage with annular recesses 146. As assembled in this manner, the inner body 140 is centrally retained within interior cavity 126 of outer body 102 by the engagement of circumferential flanges 146 and annular recesses 146 and by the engagement of ribs 128 with the sound-producing member 150 wrapped about sidewall 142 of inner body 140.

Pet toy 100 is thereafter ready for use, for example, by providing pet toy 100 to an animal to interact with. As an animal, such as a dog, bites or otherwise compresses sidewall 120, one or more of ribs 128 focus the force applied to sidewall 120 on sound-producing member 150, causing a sound, such as a crinkling, crackling, rustling and/or crunching sound, to be produced by sound-producing member 150, thus rewarding and/or incentivizing the animal's interaction with pet toy 100. The animal may optionally be further incentivized to interact with pet toy 100 by the placement of items 162, such as food items or treats, within interior cavity 160 of inner body 140 via openings 108, 112 prior to or during use. As the animal moves, deforms, and bites pet toy 100, items 162 are dispensed via openings 108, 112 to an exterior of the pet toy 100. The challenge to the animal of obtaining items 162 from pet toy 100 can be increased, for example, by sizing items 162 and openings 112 such that items 162 must be broken by the animal's chewing action applied to pet toy 100 prior to broken fragments of items 162 exiting opening(s) 112 and/or 108.

As has been described, in some embodiments an article includes flexible and resilient outer and inner bodies, where the inner body is at least partially disposed within the outer body. In addition, an unsealed sound-producing member surrounds at least a portion of the inner body and is disposed between the inner and outer bodies, such that the sound-producing member produces sound when the outer body is deformed. In one embodiment, the outer body includes an interior cavity and a plurality of inwardly facing projections that project into the interior cavity to focus force applied to the outer body on the sound-producing member. In one embodiment, the inner body includes a sidewall defining an interior cavity for holding items to be dispensed, and the article has one or more openings through the inner and outer bodies through which items can be inserted into and dispensed from the interior cavity of the inner body during use of the article.

While the present invention has been particularly shown as described with reference to one or more preferred embodiments, it will be understood by those skilled in the art that various changes in form and detail may be made therein without departing from the spirit and scope of the invention. For example, although the present invention has been described with reference to a particular embodiment in which article is a pet toy, the present invention as described may also be embodied in other useful articles, such as containers, treat and food dispensers, and balls.

What is claimed is:

1. An article for producing a sound when deformed, the article comprising:
   a flexible and resilient outer body having an elongate interior cavity, wherein the elongate interior cavity extends along a longitudinal axis;
   a flexible and resilient inner body at least partially disposed within the elongate interior cavity of the outer body; and
   an unsealed sound-producing member disposed within the elongate interior cavity of the outer body, wherein the sound-producing member has a dimension extending along the longitudinal axis and surrounds at least a portion of the inner body, wherein the outer body has an inner surface including a plurality of inwardly facing projections, and wherein each of the plurality of inwardly facing projections extends along the longitudinal axis for at least a majority of the dimension of the sound-producing member and projects into the elongate interior cavity of the outer body, and wherein the plurality of inwardly facing projections are configured to focus force applied to the outer body on the sound-producing member, such that the sound-producing member produces sound when the outer body is deformed.

2. The article of claim 1, wherein:
   the inner body includes a sidewall defining an interior cavity for holding items to be dispensed;
   the interior cavity of the inner body is within a portion of the inner body disposed within the outer body; and
   the article has one or more openings through the inner and outer bodies through which items can be inserted into the interior cavity of the inner body and dispensed from the interior cavity of the inner body during use of the article.

3. The article of claim 1, wherein the article comprises a pet toy.

4. The article of claim 1, wherein the sound-producing member produces at least one of a crackling, crinkling, crunching, and rustling sound when deformed.

5. The article of claim 1, wherein the outer body has a form of a ball.

6. The article of claim 5, wherein the sound-producing member comprises a rolled sheet of polyethylene terephthalate (PET).

7. The article of claim 1, wherein:
   the elongate interior cavity of the outer body has at least one surface feature that engages a corresponding feature of the inner body to retain, within the elongate interior cavity, said at least a portion of the inner body disposed within the elongate interior cavity of the outer body.

8. The article of claim 7, wherein the surface feature comprises a recess and the corresponding feature comprises a flange.

9. The article of claim 1, wherein an innermost surface of each of the plurality of inwardly facing projections is configured to engage the sound-producing member along at least a majority of the dimension, such that contact between the plurality of inwardly facing projections and sound-producing member is made without adhesion there between.

10. A pet toy, comprising:
   a flexible and resilient outer body, wherein the outer body includes an inner surface defining a first interior cavity, wherein the first interior cavity is elongate and extends along a longitudinal axis;
   a flexible and resilient inner body at least partially disposed within the first interior cavity of the outer body, wherein the inner body includes a sidewall defining a second interior cavity for holding items to be dispensed and the second interior cavity is within a portion of the inner body disposed within the first interior cavity; and
   an unsealed sound-producing member within the first interior cavity of the outer body and surrounding at least a portion of the inner body, wherein the sound-producing member has a dimension extending along the longitudinal axis;

wherein the pet toy has one or more openings through the inner and outer bodies through which items can be inserted into the second interior cavity and dispensed from the second interior cavity during use of the pet toy;

wherein the inner surface of the outer body has a plurality of inwardly facing projections, and wherein each of the plurality of inwardly facing projections extends along the longitudinal axis for at least a majority of the dimension of the sound-producing member and projects into the first interior cavity of the outer body, and wherein the plurality of inwardly facing projections are configured to focus force applied to the outer body on the sound-producing member, such that the sound-producing member produces sound when the outer body is deformed.

11. The pet toy of claim 10, wherein the sound-producing member produces at least one of a crackling, crinkling, crunching, and rustling sound when deformed.

12. The pet toy of claim 11, wherein the sound-producing member comprises a rolled sheet of polyethylene terephthalate (PET).

13. The pet toy of claim 10, wherein the outer body has a form of a ball.

14. The pet toy of claim 10, wherein:
the first interior cavity of the outer body has at least one surface feature that engages a corresponding feature of the inner body to retain, within the first interior cavity of the outer body, said at least a portion of the inner body disposed within the outer body.

15. The pet toy of claim 14, wherein the surface feature comprises a recess and the corresponding feature comprises a flange.

16. An article for producing a sound when deformed, the article comprising:
a flexible and resilient outer body having an inner surface defining an elongate interior cavity extending along a longitudinal axis;
a flexible and resilient inner body at least partially disposed within the interior cavity of the outer body; and
an unsealed sound-producing member surrounding at least a portion of the inner body and disposed within the elongate interior cavity of the outer body, wherein the sound-producing member has a dimension extending along the longitudinal axis, and wherein the inner surface of the outer body has a plurality of inwardly facing projections projecting into the elongate interior cavity of the outer body, and wherein an innermost surface of each of the plurality of inwardly facing projections is configured to engage the sound-producing member along at least a majority of the dimension, such that contact between the plurality of inwardly facing projections and sound-producing member is made without adhesion there between and such that the sound-producing member produces sound when the outer body is deformed.

* * * * *